United States Patent [19]

Black et al.

[11] Patent Number: 5,684,962
[45] Date of Patent: Nov. 4, 1997

[54] CONTEXT CONTROL BLOCK FOR COMPUTER COMMUNICATIONS

[75] Inventors: Jeffrey T. Black, Wellesley, Mass.; Jeffrey A. Weiss, Smithfield, R.I.

[73] Assignee: Telco Systems, Inc., Norwood, Mass.

[21] Appl. No.: 519,048

[22] Filed: Aug. 24, 1995

[51] Int. Cl.⁶ .................. G06F 12/02; G06F 13/38
[52] U.S. Cl. .............. 395/200.15; 395/800; 395/474; 395/416
[58] Field of Search .................. 395/416, 338, 395/800, 200.17, 200.01, 474, 200.15, 476, 200.16, 200.19, 475; 364/DIG. 1, DIG. 2; 370/503, 517, 535, 543, 538, 402

[56] References Cited

U.S. PATENT DOCUMENTS

| | | | |
|---|---|---|---|
| 4,759,014 | 7/1988 | Decker et al. | 370/503 |
| 5,341,483 | 8/1994 | Frank et al. | 395/416 |
| 5,434,863 | 7/1995 | Onish et al. | 370/402 |
| 5,590,355 | 12/1996 | Shichiku et al. | 395/800 |

OTHER PUBLICATIONS

MC68606, Multi-Link LAPD (MLAPD) Protocol Controller Technical Summary (Motorola, Inc. 1987) pp. 1–15.

*Primary Examiner*—Daniel H. Pan
*Attorney, Agent, or Firm*—Wolf, Greenfield & Sacks, P.C.

[57] ABSTRACT

A single queue or descriptor ring references several context control blocks, each of which corresponds to a different data path in a communications system. An entry in the descriptor ring references an appropriate context control block and a source packet representing a packet locations prior to processing. The descriptor ring may include a destination packet representing the packet locations after processing. The descriptor ring is particularly suitable for communications between a main processor and a coprocessor.

33 Claims, 6 Drawing Sheets

FIG. 9

CONTEXT CONTROL BLOCK FOR COMPUTER COMMUNICATIONS

BACKGROUND OF THE INVENTION

1. Field of the Invention

This invention relates generally to computer systems, and more particularly to communication between two processors.

2. Discussion of the Related Art

Communication of data from one processor to another processor may be performed using a variety of techniques. Several techniques use shared memory, in which both processors have read and write access to the same memory. Thus, if one of the processors writes data to the shared memory, the other processor may read the data from such memory.

In order to implement a shared memory technique, both processors must have information defining the content of the shared memory. For example, one location of the shared memory may represent a command location, which contains a command or several commands from one processor to the other. Additionally, a location may reference other locations in the shared memory, so that the processor reading this location will know where to read for the appropriate data.

Queues may also be established within the shared memory in order to support data such as communications data. For example, communications controllers which support multiple paths provide a separate queue or set of queues for each path. The Motorola MC68606 LAPD controller is one example of such a communications controller. However, when separate queues are provided, a processor must poll the status of each queue in order to determine whether the queue contains data for the processor. A disadvantage to this technique is that the polling requires substantial resources, such as processing time and memory bus bandwidth. It is therefore desirable to provide a communications technique that reduces the resources required.

SUMMARY OF THE INVENTION

In order to reduce the resources for communicating between two processors, one embodiment of the invention provides a single queue or descriptor ring which references several context control blocks, each of which corresponds to a different logical or physical data path in a communications system. An entry in the descriptor ring references an appropriate context control block and a source packet representing a packet location prior to processing. The entry may also reference a destination packet representing the packet locations after processing. In one embodiment, a destination entry references the destination packet. The context control block may include new data generated by one of the two processors.

One embodiment of the invention is directed to a method for communicating between a first processor and a second processor with respect to a plurality of data paths. A plurality of context control blocks is created, each corresponding to one of the plurality of data paths. An input data packet, associated with one of the plurality of data paths is received and placed into a first input packet location. A descriptor entry is created, preferably in a descriptor ring, that corresponds to the input data packet. The descriptor entry includes a context control block pointer and an input packet pointer. The input data packet is then processed, using the appropriate context control block, and the resulting output data packet is placed in an output data packet location. The descriptor entry may also reference the output data packet location. In one embodiment, a destination descriptor entry references the output data packet location. The context control block may reference new or updated compression or encryption control variables generated by one of the two processors.

Another embodiment is directed to an apparatus for communicating between a first processor and a second processor with respect to data associated with a plurality of data paths. The apparatus includes a shared memory having an input packet location and an output packet location, and a descriptor ring including at least one descriptor entry. The descriptor entry includes a context control block pointer and an input packet pointer. In one embodiment, the descriptor entry also includes an output packet pointer. Alternatively, a destination descriptor entry may be provided which includes the output packet pointer.

A further embodiment is directed to an apparatus for communicating between a first processor and a second processor with respect to data associated with a plurality of data paths, comprising a plurality of context control blocks, an input data packet stored in a first input packet location, a descriptor entry including a context control block pointer and an input packet pointer that references the first input packet location. The apparatus may also include an output packet pointer. In this embodiment, the second processor uses the appropriate context control block to create an output data packet from the input data packet. The second processor may also create new or updated compression or encryption control variables, and update the context control block to reference these variables.

In any of these embodiments, the descriptor entry may include a command block which may be written to and read from to further facilitate communications. In alternate embodiments, the context control block references compression data, encryption data, or both. In further embodiments, a second descriptor ring may be created which is associated with another physical data path or another virtual data path.

BRIEF DESCRIPTION OF THE DRAWINGS

Other features and advantages of the present invention shall appear from the following description of an exemplary embodiment, said description being made with reference to the appended drawings, of which.

DETAILED DESCRIPTION

Figure 1:
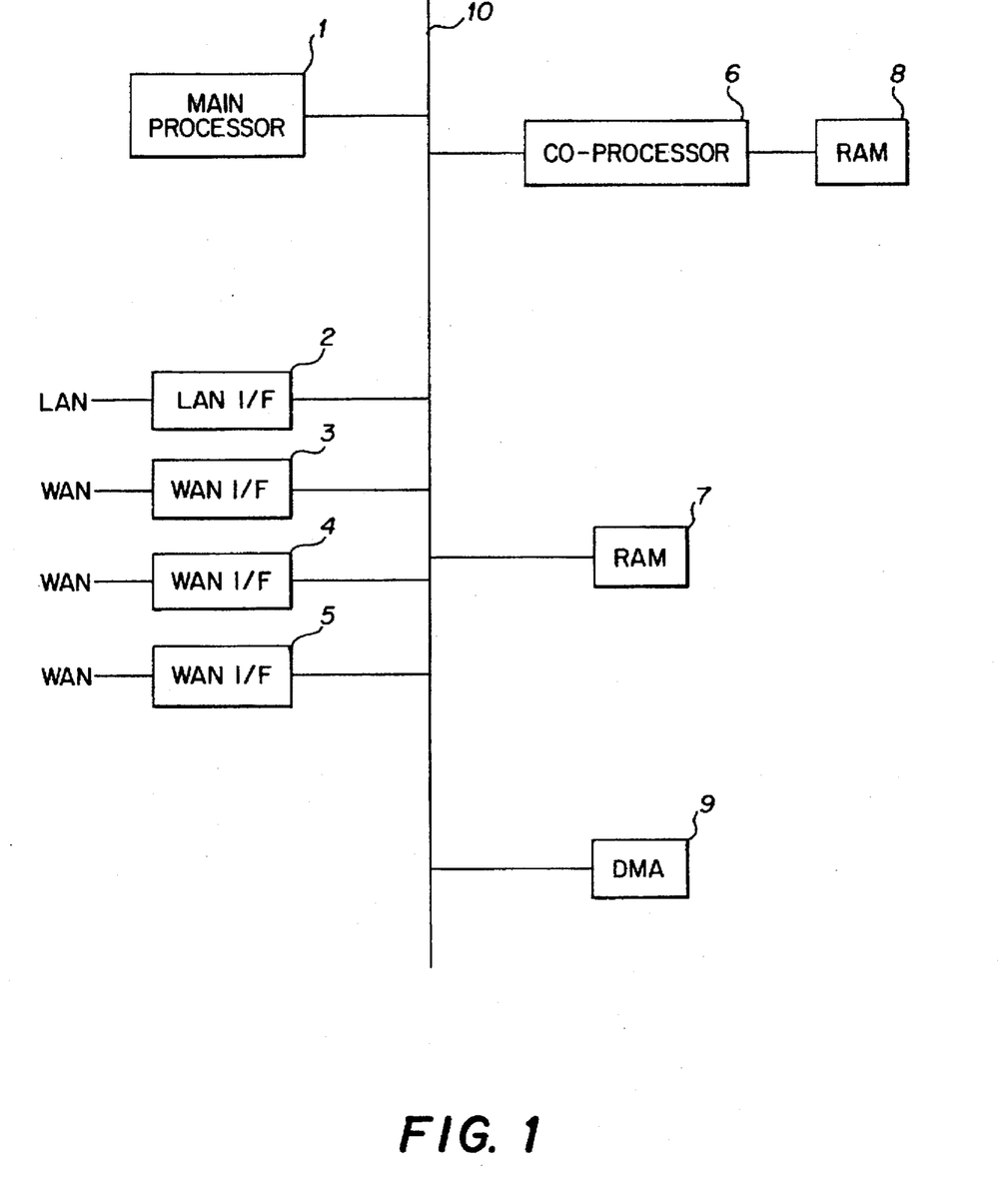
FIG. 1 is a block diagram of a communications router within which several data paths may exist.

FIG. 1 shows an illustrative system in which a main processor 1 communicates with a coprocessor 6 via a shared memory such as RAM 7. The elements shown have access to interface bus 8. In particular, FIG. 1 illustrates an architecture of a communications bridge or router for receiving data traffic from a Local Area Network (LAN) segment and transporting the data traffic across an appropriate Wide Area Network (WAN). Additionally, the router may support data traffic to and from any of the LAN or WAN interfaces. LAN interface 2 provides the LAN interface functions, for example Ethernet protocol processing if the LAN is an Ethernet network. Additionally, when a communications packet is received by LAN interface 2, LAN interface 2 places the packet into Random Access Memory (RAM) 7. One of the WAN interfaces 3, 4, 5 may then read the packet from RAM 7 and transport the packet to the appropriate WAN. Direct Memory Access Controller (DMA) 9 may also be provided to support memory transfer functions for the main processor 1 and coprocessor 6. In one embodiment, the DMA 9 is embedded within coprocessor 6. A system such as that shown in FIG. 1 may include any number of interfaces and is not limited to either the number or the type of interfaces shown. Additionally, when a packet is received by a WAN interface 3, it will be placed in RAM 7 to be transported to the appropriate WAN or LAN.

In such a system, it is often desirable to either compress or encrypt the data packet before transporting the data packet out of the router. For example, the bandwidth available across a WAN may be much smaller than the bandwidth of a LAN. Accordingly, compression of a packet before transmission on a WAN will save transmission time on the WAN. Additionally, networks have varying degrees of security. For example, a WAN may be less secure than a LAN. Accordingly, it is often desirable to encrypt the packet prior to transmission on a WAN. Compression and encryption may be performed serially or simultaneously on a single packet.

Compression and encryption techniques frequently require maintenance of associated data. This data, which normally contains a collection of variables associated with a given data path, is called a context.

The nodes for a data path are generally a source and destination computer defined for a particular packet. For example, a data path may define the routing performed when a data packet is transmitted from a first communications node to a second communications node. A path that defines the actual communications nodes that the packet will pass through is called a physical data path. A virtual data path is defined by other parameters, such as simply source and destination, or some other classification of the data within the packet. Additionally, a physical data path may have many virtual data paths, each of which will result in a packet being transmitted from a first communications node to a second communications node. With respect to a system such as the router shown in FIG. 1, a first physical data path may be defined by a path in which a packet is received by the LAN interface 2 to be provided to WAN interface 3, whereas a second physical data path may be defined by a path in which a packet is received by the LAN interface 2 to be provided to WAN interface 4. Additionally, however, different data packets may have different virtual data paths even though they are destined to both travel from LAN interface 2 to WAN interface 3, for example. This may be due to the fact that they originate from different communications nodes, or simply are associated with data which requires different compression or encryption.

In compression techniques, the context for a given data path typically includes an adaptive dictionary dependent upon previously processed data, as well as pointers used for the maintenance of the adaptive dictionary. Additionally, error detection variables and buffers may be maintained for each context.

In encryption techniques, the context for a data path typically includes encryption keys and initialization vectors associated with the data path, and other variables used for maintenance of the data path.

Furthermore, since compression and encryption techniques are often very specialized, the compression and encryption functions may often be performed more efficiently using a coprocessor 6 which may be designed specifically to perform compression, encryption, or both. Coprocessor 6 may also have its own RAM 8. In a system such as that shown in FIG. 1, the coprocessor 6 performs most of the processing associated with compression and encryption. Alternatively, several coprocessors may perform this processing. Main processor 1 communicates with coprocessor 6 in order to, for example, command the coprocessor 6 to perform encryption on a received packet, or to indicate the manner in which the encryption should be performed. The coprocessor 6 performs the encryption using the context associated with the data path of the received packet, and provides completion and error status back to main processor 1. The appropriate WAN interface 3 may then transport the encrypted packet.

As described above, the communications between the main processor 1 and coprocessor 6 may be performed using a shared memory, such as RAM 7. In such an instance it may not be desirable to have several queues, each for one of the possible data paths having an associated context.

A descriptor ring is a particular type of queue which contains data within the shared memory. A pointer is used to identify the appropriate entry in the descriptor ring. For example, the main processor 1 may set a pointer to reference the next packet which the coprocessor 6 is to compress or encrypt. The main processor 1 may then increment this pointer to reference the next location when a new packet is received. Generally, a descriptor ring contains an entry, at the bottom location, which references the top entry. In this manner, when the main processor 1 reaches the bottom entry, the main processor 1 knows to put the next packet or descriptor data for the next packet into the top location.

A queue or a descriptor ring for such a communications technique may be implemented by providing a separate queue or descriptor ring for each data path, since the context may be different for each data path. Referring to FIG. 1, one descriptor ring would be associated with the physical data path from the LAN to the WAN connected to WAN interface 3, and another descriptor ring would be associated with the physical data path from the LAN to the WAN connected to WAN interface 4. This arrangement may result in processing inefficiencies since both the main processor 1 and the coprocessor 6 must poll each descriptor ring.

Figure 2:
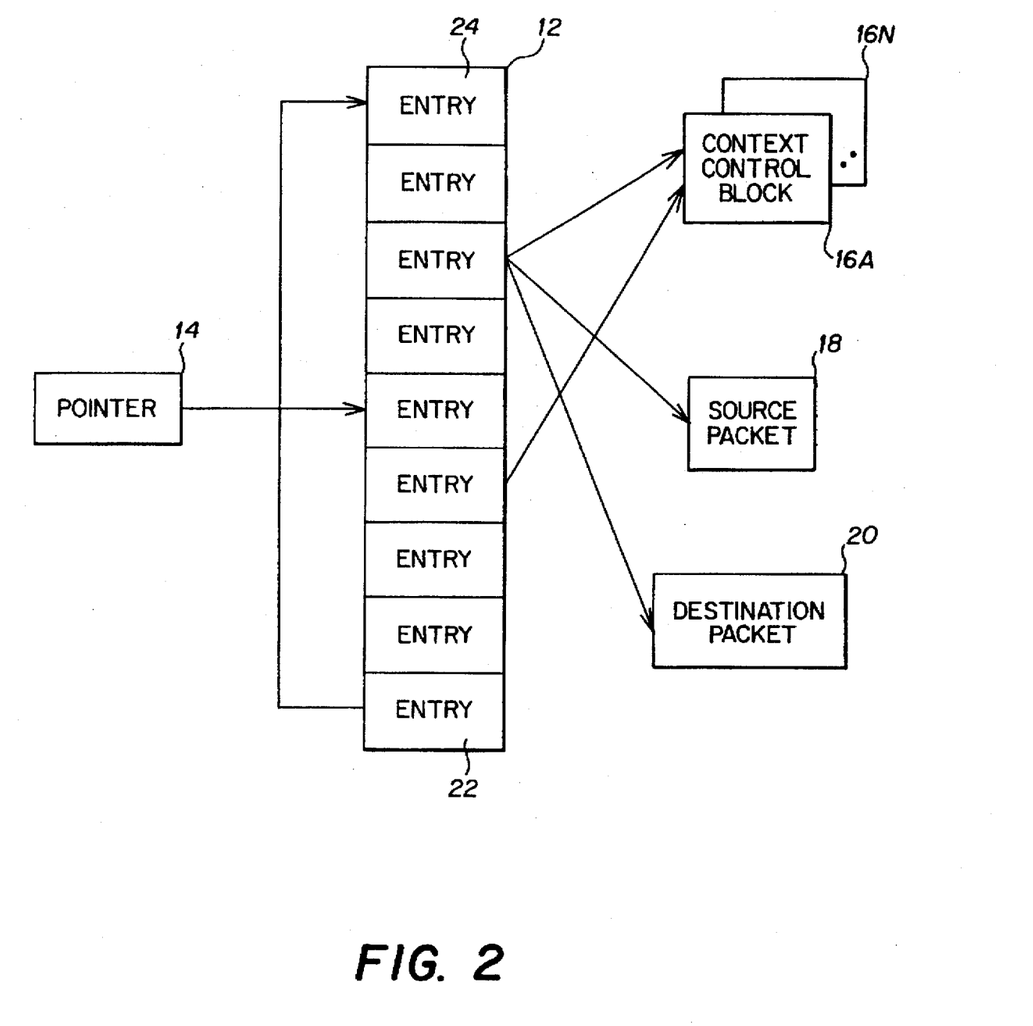
FIG. 2 is a diagram illustrating a descriptor ring in accordance with an embodiment of the invention, which may reside within the communications router.

In one embodiment of this invention, a descriptor ring is provided which supports more than one context, and can therefore support more than one data path. FIG. 2 is a block diagram of such a descriptor ring, which may reside within RAM 7 and be controlled by main processor 1. As shown in FIG. 2, an entry in descriptor ring 12 is referenced by pointer 14. Several context control blocks 16A–16N may be associated with descriptor ring 12. An entry in the descriptor ring 12 generally includes three pointers. One pointer references a location in RAM 7 which contains a packet which was received, referred to as source packet 18. Another pointer references the appropriate context control block 16, for example the context control block that is associated with the data path of the packet. A third pointer references a location referred to as the destination packet location 20, which represents the location where coprocessor 6 will store the results of the encryption or compression. Several entries may reference the same context control block 16, for example if several packets were received with the same data path. If implemented as a ring, the bottom entry 22 may reference the top entry 24. In one embodiment the descriptor ring 12 may be implemented in a memory such as RAM 7 and controlled by main processor 1.

However, as will be readily apparent to those skilled in the art, the descriptor ring 12 and associated pointer 14 may be implemented in special purpose hardware. For example, descriptor ring 12 could be implemented as a First In First Out (FIFO) memory, with pointer 14 being a pointer circuit which tracks access by main processor 1 and coprocessor 6.

Figure 3A:
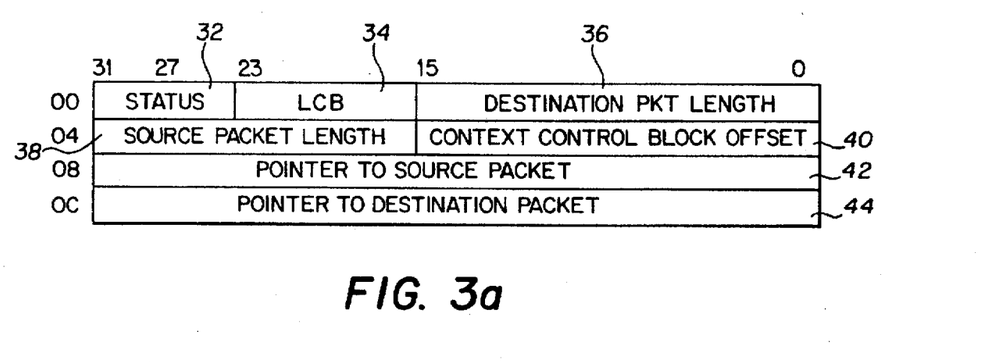
FIG. 3a shows detail of a descriptor entry, contained within a descriptor ring, in accordance with an embodiment of the invention.

A more detailed view of a descriptor entry in descriptor ring 12 is illustrated in FIG. 3a. In this embodiment, each descriptor entry has a status field 32, an error detection field 34 such as a Longitudinal Check Byte (LCB) field, destination packet length 36, source packet length 38, context control block offset 40, pointer to source packet 42, and pointer to destination packet 44. In this embodiment, the status field 32 may be used to communicate commands and replies between main processor 1 and coprocessor 6. The destination packet length 36 and source packet length 38 define the size, respectively, of the destination and source packets. Context control block offset 40 references the location of the appropriate context control block 16, and pointer 42 and pointer 44 reference the respective locations of the source and destination packet.

Figure 3B:
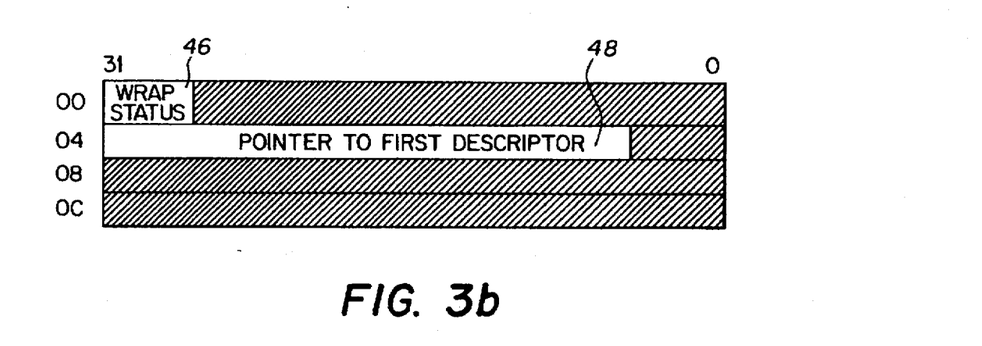
FIG. 3b shows detail of a bottom descriptor entry also contained within a descriptor ring, in accordance with an embodiment of the invention.

As depicted in FIG. 3b, the bottom descriptor of descriptor ring 12 contains wrap status 46 (8 bits for a preferred embodiment), and pointer to first descriptor 48 (i.e., points to descriptor entry 24).

Figure 4:
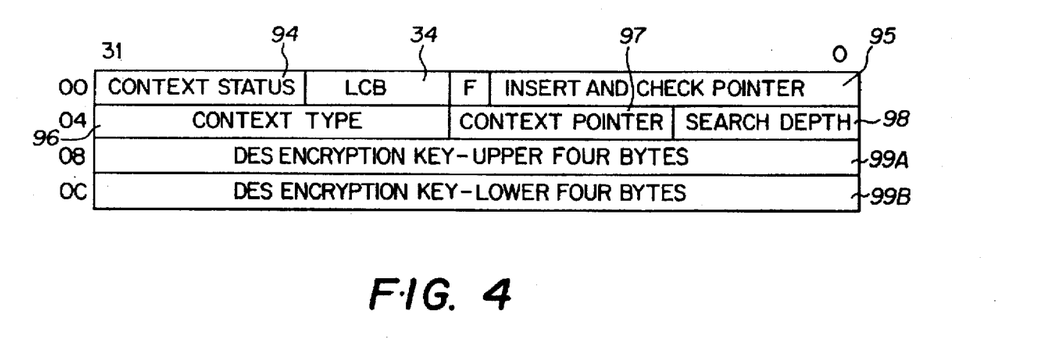
FIG. 4 shows detail of a context control block in accordance with an embodiment of the invention.

FIG. 4 shows detail of a context control block 16 for encryption. A context control block for compression is similar, but instead of information regarding encryption such as encryption keys, a compression context control block references compression information such as an adaptive dictionary. Context status field 94 provides information regarding the status of the context control block 16. Error correction field 34 is also provided, along with insert and check pointer field 95. Context type field 96 is used to establish the type of context, in order to allow unique control over each context without real time processing intervention. Context pointer 97 may reference a location of any other data relevant to encryption, such as a history buffer. Since FIG. 4 is an example of an encryption context control block, it contains search depth field 98, along with encryption key fields 99A and 99B.

Since each source packet is associated with a particular data path, it will be processed according to the context associated with that particular data path. As discussed above, each data path may have its own particular context, for example state information and compression history. This context is used by coprocessor 6 when a source packet is processed to create a destination packet, and may be updated when the process is completed. In a preferred embodiment, context control block 16 also references other locations that contain control variables such as a dictionary, history information, or encryption keys, instead of the context control block containing the dictionary itself.

Figure 5:
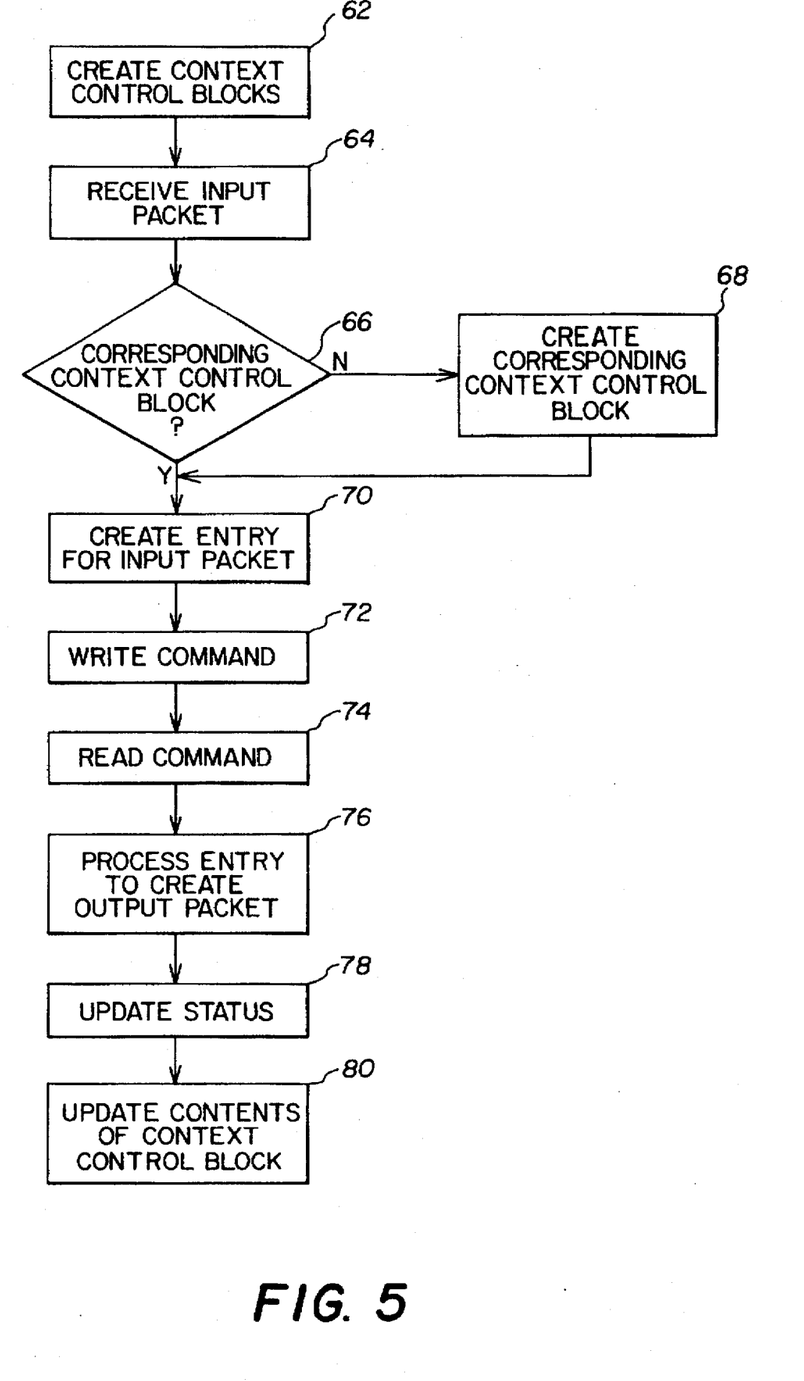
FIG. 5 is a flow diagram of a process in accordance with the teachings of the invention.

FIG. 5 is a flow chart showing a method according to an exemplary embodiment of the invention. In step 62, context control blocks are created. If the data for these context control blocks 16A–16N previously exists, the appropriate data or referencing information is simply stored in an appropriate location. As new information is received, context control blocks 16A–16N may be updated. The information for a context control block may be received from an external device such as a network controller, or may be stored in memory associated with main processor 1. In step 64, an input packet is received, for example a source packet received by LAN interface 2. In step 66, a corresponding context control block 16 is determined. If a corresponding context control block 16 does not exist, one may be created in step 68. Alternatively, the lack of a corresponding context control block 16 may be indicative of an error. If so, an appropriate error message may be generated. From step 66 or step 68, the process continues to step 70. In step 70, an entry for the input packet is created in the descriptor ring. As described above, the entry includes a context control block pointer, an input packet pointer, and an output packet pointer. Additionally, it may include a status entry or other information.

In step 72, a command is written to RAM 7, in order to command coprocessor 6 to perform a function, and in step 74 the command is received and read by the coprocessor 6. The coprocessor 6 performs the function by processing the entry, and creates an output packet in step 76. The output packet is stored in a location defined by the entry created in step 66. In step 76, the status is updated, generally by coprocessor 6, to inform the main processor 1 that the processing has been completed. Additionally, the main processor 1 may update pointer 14.

FIG. 5 also depicts step 80, in which the contents of the corresponding context control block is updated. This is an optional step, which is performed if the step 76 of processing the entry resulted in a modification of the compression or encryption control variables referenced by the context control block. For example, if the step of processing the entry 76 was a compression which used an adaptive dictionary, then pointers pertaining to the adaptive dictionary may be updated as a result. If the step of processing the entry 76 was an encryption, the initialization vectors within the context control block 16 may be updated as a result of the encryption.

In another embodiment, status block 32 may include two or more status blocks, for example one command block which can contain commands from main processor 1 to coprocessor 6, and one response block which contains responses from coprocessor 6 to main processor 1.

Alternatively, instead of utilizing a status block 32 for command and status information communicated between the main coprocessor 1 and coprocessor 6, known communications techniques may be used. In such an embodiment, steps 72, 74, and 78 may be achieved in any manner, for example the main processor 1 may modify a register within coprocessor 6 to provide a command.

By using a descriptor ring 12 which can reference several context control blocks, less polling is required by the main processor and coprocessor than would otherwise be required. Accordingly, the processing may be performed more efficiently and may result in an increase in throughput.

As described above, a single descriptor ring 12 may be provided to support an entire router system as shown in FIG. 1. However, it may be advantageous to provide two or more descriptor rings 12, for example, if processing efficiency might be improved. This may be the case if communications in one direction have an equal or higher priority than communications in another direction. An example of this would be one descriptor ring 12 for data in one direction, for example from the LAN to any one of the WANs, and another for the opposite direction, for example from any one of the WANs to the LAN. Furthermore, it is possible to provide several descriptor rings. Even in such an instance, the advantage is that each descriptor ring may reference several context control blocks. Moreover, instead of allocating descriptor rings based on direction as described above, it also may be advantageous to allocate descriptor rings based on the function being performed on the source packet. An example of such an allocation is described below.

In one embodiment, a coprocessor 6 supports four descriptor rings. The rings are allocated depending upon the operating mode of the coprocessor 6. In one operating mode the rings are allocated as two independent descriptor rings for compression, and two independent descriptor rings for decompression. Alternatively, in a mode referred to as fragmentation mode, the rings are allocated as source and destination ring pairs for compression and decompression.

Figure 6:
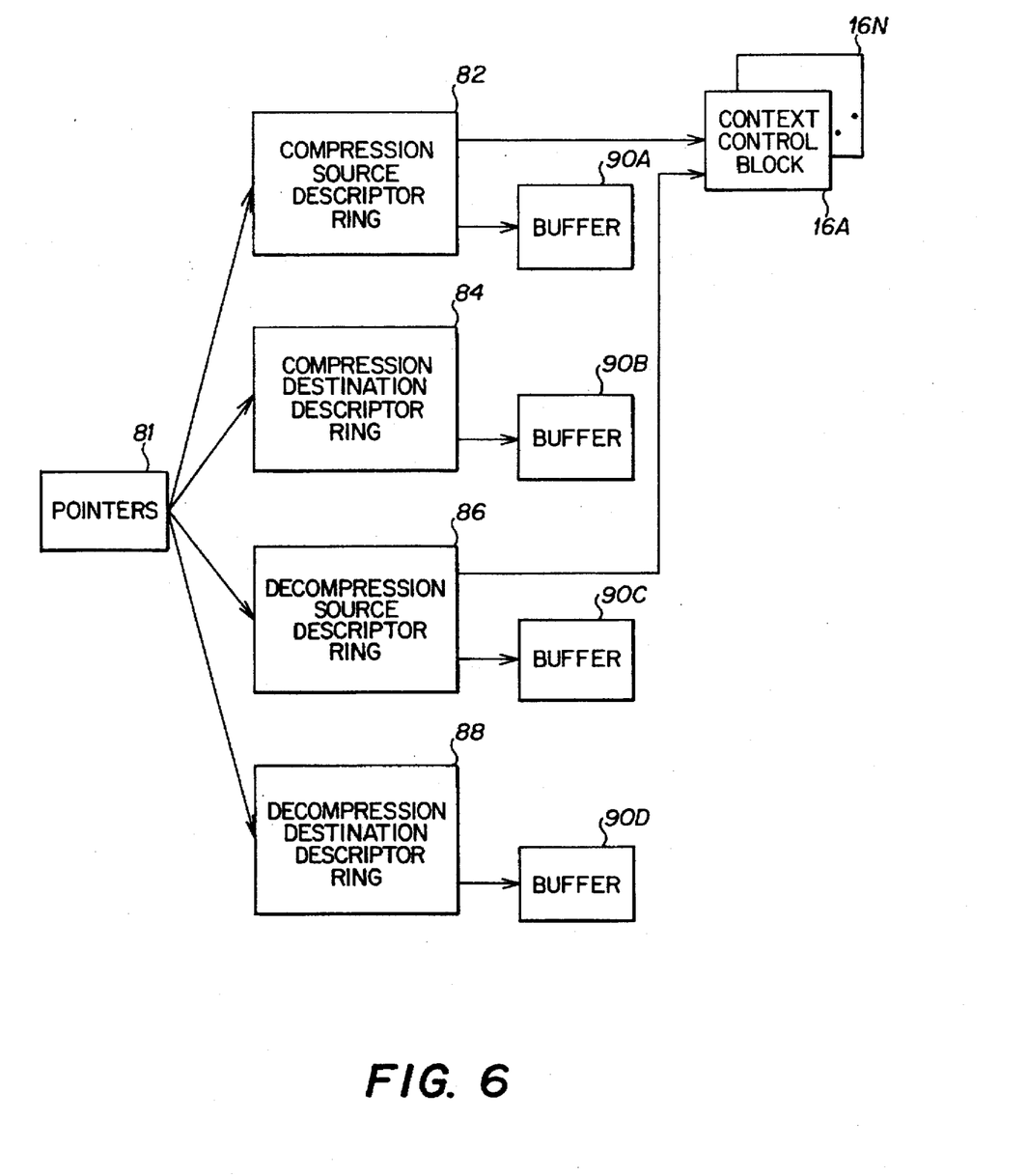
FIG. 6 shows an alternate embodiment which includes several descriptor rings.

An example of four rings in fragmentation mode is illustrated in FIG. 6, which shows compression source descriptor ring 82, compression destination descriptor ring 84, decompression source descriptor ring 86, and decompression destination descriptor ring 88. Associated with each ring is one of the buffers 90A–90D. Also associated with the source rings 82, 86 are context control blocks 16A–16N. In FIG. 6 only one arrow is shown going to each buffer 90A–90D and to context control blocks 16A–16N for simplicity, but as in the previous embodiments, each ring may contain several entries, each of which has such a pointer. As in the embodiment shown in FIG. 2, a pointer or pointers 81 may be provided to track the descriptor entry to be processed.

In operation, entries within the source rings 82, 86 reference the appropriate context control block 16 as well as a location within the associated buffer 90A, 90C which contains the source packet. In this manner, coprocessor 6 processes the source packet using data referenced by the appropriate context control block 16, to generate a destination packet.

Entries within the destination rings 84, 88 point to free locations (locations that do not contain current data) within buffers 90B, 90D. Then, when a destination packet is prepared by coprocessor 6, a location within buffer 90B or 90D may be appropriated. This appropriation may be performed by DMA 9, which may also provide other memory transfer functions.

Figure 7:
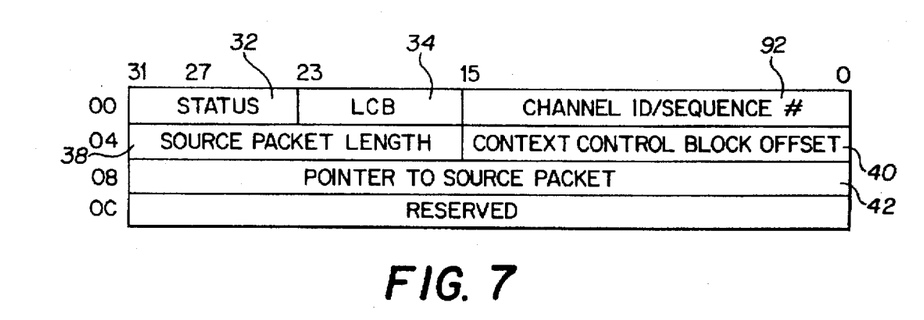
FIG. 7 shows detail of an exemplary source descriptor entry within one of the source rings shown in FIG. 6.
Figure 8:
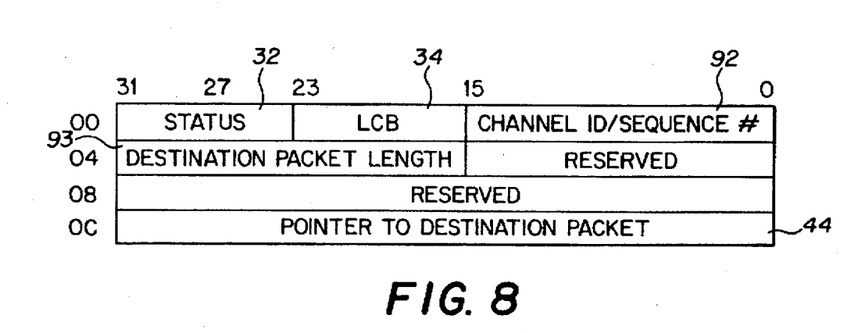
FIG. 8 shows detail of an exemplary destination descriptor entry within one of the destination rings in FIG. 6.

FIG. 7 shows detail of an exemplary source descriptor entry within one of the source rings 82, 86. FIG. 8 shows detail of an exemplary destination descriptor entry within one of the destination rings 84, 88. FIGS. 7 and 8 may be compared with FIG. 3A, and similar elements are given similar reference designations. In FIG. 7, however, no information is needed regarding the location of the destination packet, because this information is provided by destination descriptor rings 84, 88. Similarly, the destination entry of FIG. 7 does not need information regarding the source packet. Instead, the destination entry provides destination packet pointer 44 and destination packet length 94.

FIGS. 7 and 8 also show Channel ID/Sequence number field 92. This field provides identifying information which may associate a number of locations within one of the buffers 90A–90D. For example, complete communications packets received for processing may be of varying size. Therefore, it may be advantageous to segment a complete packet into several source packets which are more appropriate for processing. Once these complete packets are segmented, the channel ID/Sequence number field 92 provides an identifier which would associate the source packets which together make up the complete packet.

Figure 9:
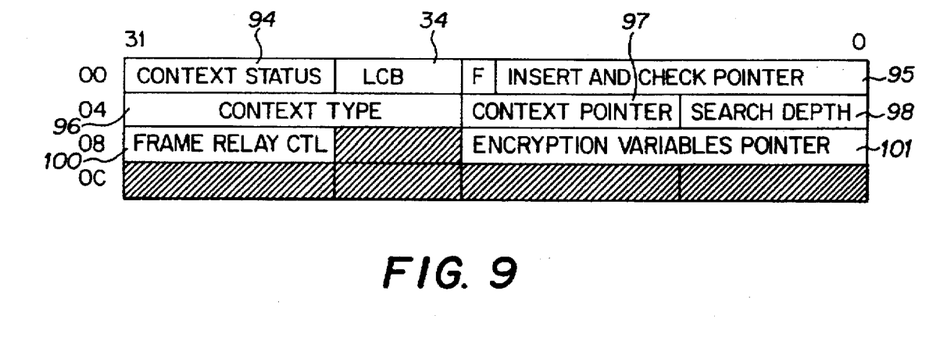
FIG. 9 illustrates an alternate form of a context control block, which may be compared with FIG. 4.

An alternate form of a context control block 16 is depicted in FIG. 9, which may be compared with FIG. 4. Instead of encryption key fields 99A and 99B, encryption variables pointer 101 references a location in memory that contains the appropriate encryption key, as well as the initialization vectors to be used with the context control block. FIG. 9 also shows a frame relay control field 100, which contains a command to DMA 9 to copy some of the data of the source packet directly into a destination packet without compression or encryption. This field may be used when, for example, a packet contains a header which identifies routing information. Since other nodes along the route which the packet will take will use the routing information, it may be preferred to leave the routing information in an uncompressed mode.

Having thus described several embodiments of the invention, various alterations, modifications, and improvements will readily occur to those skilled in the art. For example, the invention may be applied to other functions which lend themselves to coprocessing, such as signal processing or sorting functions in which different sort techniques are used depending upon the data to be sorted. In such examples, files of information are processed instead of the packets as described above. Furthermore, the context control blocks may be used to communicate between any two devices, such as two processors, or even among several devices. Such alterations, modifications, and improvements are intended to be within the spirit and scope of the invention. Accordingly, the foregoing description is by way of example only, and not intended to be limiting. The invention is limited only as defined in the following claims and the equivalents thereto.

What is claimed is:

1. A method for communicating between a first processor and a second processor with respect to data associated with a plurality of data paths, comprising the steps of:

creating a plurality of context control blocks, each of the plurality of context control blocks corresponding to one of the plurality of data paths;

receiving an input data packet associated with a first data path of the plurality of data paths, and placing the input packet into a first input packet location;

creating a descriptor entry corresponding to the input data packet, the descriptor entry including a context control block pointer that references the context control block corresponding to the first data path, and an input packet pointer that references the first input packet location; and     processing the input data packet, using the context control block corresponding to the first data path, to create an output data packet and placing the output data packet in an output data packet location.

2. The method of claim 1, wherein the step of creating a descriptor entry includes creating a status block, the method further including the steps of:

writing, by the first processor, a command to the status block of the descriptor entry to command the second processor to process the input data packet;

reading, by the second processor, the command from the status block of the descriptor; and updating, by the second processor, the status of the descriptor entry to notify the first processor that the input data packet has been processed.

3. The method of claim 1, wherein one of the plurality of context control blocks references compression data, and wherein the step of processing includes compressing the input data packet according to the compression data.

4. The method of claim 3, wherein one of the plurality of context control blocks further references encryption data, and wherein the step of processing further includes encrypting the input data packet according to the encryption data.

5. The method of claim 1, wherein one of the plurality of context control blocks references encryption data, and wherein the step of processing includes encrypting the input data packet according to the encryption data.

6. The method of claim 1, further including the step of creating a descriptor ring, and wherein the step of creating a descriptor entry includes creating the descriptor entry in the descriptor ring.

7. The method of claim 6, wherein the descriptor ring is associated with data of a first physical data path, the method further including the step of creating a second descriptor ring that is associated with data of a second physical data path that is different from the first physical data path.

8. The method of claim 6, wherein the descriptor ring is associated with data of a first virtual data path, the method further including the step of creating a second descriptor ring that is associated with data of a second virtual data path that is different from the first virtual data path.

9. The method of claim 1, wherein the step of creating a descriptor entry includes defining an output packet pointer that references the output data packet location, and wherein the step of processing includes placing the output data packet in the output data packet location defined in the step of creating.

10. The method of claim 1, wherein the step of processing further includes creating a destination descriptor entry including an output packet pointer that references the output data packet location.

11. The method of claim 1, wherein the step of processing the input data packet includes generating new data for the context control block, and wherein the method further includes a step of updating the context control block to include the new data.

12. An apparatus for communicating between a first processor and a second processor with respect to data associated with a plurality of data paths, comprising:

a shared memory coupled to the first processor and the second processor, the shared memory having an input packet location for an input data packet and an output packet location for an output data packet; and a descriptor ring having a plurality of descriptor entry locations, the descriptor ring including at least one descriptor entry located in one of the plurality of descriptor entry locations, each descriptor entry including:

a context control block pointer that references the context control block corresponding to one of the plurality of data paths; and an input packet pointer that references the input packet location;

wherein the output data packet represents the input data packet that has been processed by the second processor in accordance with information identified by the context control block.

13. The apparatus of claim 12, wherein the descriptor entry further includes a status block that stores a command from the first processor to the second processor.

14. The apparatus of claim 12, wherein the context control block references compression control variables.

15. The apparatus of claim 14, wherein the context control block further references encryption control variables.

16. The apparatus of claim 12, wherein the context control block references encryption control variables.

17. The apparatus of claim 12, wherein the descriptor ring is associated with data of a first physical data path, the apparatus further including a second descriptor ring that is associated with data of a second physical data path that is different from the first physical data path.

18. The apparatus of claim 12, wherein the descriptor ring is associated with data of a first virtual data path, the apparatus further including a second descriptor ring that is associated with data of a second virtual data path that is different from the first virtual data path.

19. The apparatus of claim 12, wherein the descriptor ring is stored in the shared memory.

20. The apparatus of claim 12, wherein each descriptor entry further includes an output packet pointer that references the output packet location.

21. The apparatus of claim 12, further including a destination descriptor entry that includes an output packet pointer that references the output packet location, the destination descriptor entry being entered by the second processor.

22. The apparatus of claim 12, wherein the second processor generates new status and updated control variables for the context control block by processing the input data packet, the context control block further including the new status and a reference to the updated control variables generated by the second processor.

23. An apparatus for communicating between a first processor and a second processor with respect to data associated with a plurality of data paths, the apparatus comprising:

a plurality of context control blocks, each of the plurality of context control blocks corresponding to one of the plurality of data paths;

an input data packet associated with a first data path of the plurality of data paths, the input data packet being stored in a first input packet location; and a descriptor entry corresponding to the input data packet, the descriptor entry including a context control block pointer that references the context control block corresponding to the first data path, and an input packet pointer that references the first input packet location;

wherein the second processor uses the context control block corresponding to the first data path to create an output data packet and places the output data packet in an output packet location.

24. The apparatus of claim 23, wherein the descriptor entry includes a status block that stores a command from the first processor to the second processor.

25. The apparatus of claim 23, wherein the context control block references compression control variables.

26. The apparatus of claim 25, wherein the context control block further references encryption control variables.

27. The apparatus of claim 23, wherein the context control block references encryption control variables.

28. The apparatus of claim 23, further including a descriptor ring that contains the descriptor entry.

29. The apparatus of claim 28, wherein the descriptor ring is associated with data of a first physical data path, the apparatus further including a second descriptor ring that is associated with data being of a second physical data path that is different from the first physical data path.

30. The apparatus of claim 28, wherein the descriptor ring is associated with data of a first virtual data path, the apparatus further including a second descriptor ring that is associated with data being of a second virtual data path that is different from the first virtual data path.

31. The apparatus of claim 23, wherein the descriptor entry further includes an output packet pointer that references the output packet location.

32. The apparatus of claim 23, further including a destination descriptor entry including an output packet pointer that references the output packet location.

33. The apparatus of claim 23, wherein the second processor generates new status and updated control variables for the context control block by processing the input data packet, the context control block further including the new status and a reference to the updated control variables generated by the second processor.

* * * * *